United States Patent
Butler

Patent Number: 6,092,944
Date of Patent: Jul. 25, 2000

[54] EXPANDABLE KEYBOARD INCLUDING FLEXIBLE FLAT CABLE CONDUCTORS

[76] Inventor: Robert B. Butler, 650 Union Valley Rd., Mahopac, N.Y. 10541

[21] Appl. No.: 09/324,102

[22] Filed: Jun. 2, 1999

Related U.S. Application Data

[63] Continuation-in-part of application No. 09/040,550, Mar. 18, 1998, Pat. No. 5,938,353.

[51] Int. Cl.[7] ........................................... B41J 5/16
[52] U.S. Cl. ........................... 400/492; 400/490; 361/680
[58] Field of Search ..................................... 400/472, 489, 400/492; 341/22; 361/680; 345/168

[56] References Cited

U.S. PATENT DOCUMENTS

| | | |
|---|---|---|
| 3,900,712 | 8/1975 | Fukao ........................................ 200/307 |
| 3,940,758 | 2/1976 | Mangolin ................................. 345/169 |
| 5,187,644 | 2/1993 | Crissan ..................................... 361/680 |
| 5,951,178 | 9/1999 | Lim ........................................... 400/472 |

FOREIGN PATENT DOCUMENTS 9-311744  12/1997  Japan.

*Primary Examiner*—John S. Hilten
*Assistant Examiner*—Daniel J. Colilla

[57] ABSTRACT

An alphanumeric keyboard whose keys are mounted on a scissor-linkage and have interlocking sides that allow said keyboard to contract to a width that is considerably less than the width of a standard desktop computer keyboard and which is operable when open or closed.

34 Claims, 9 Drawing Sheets

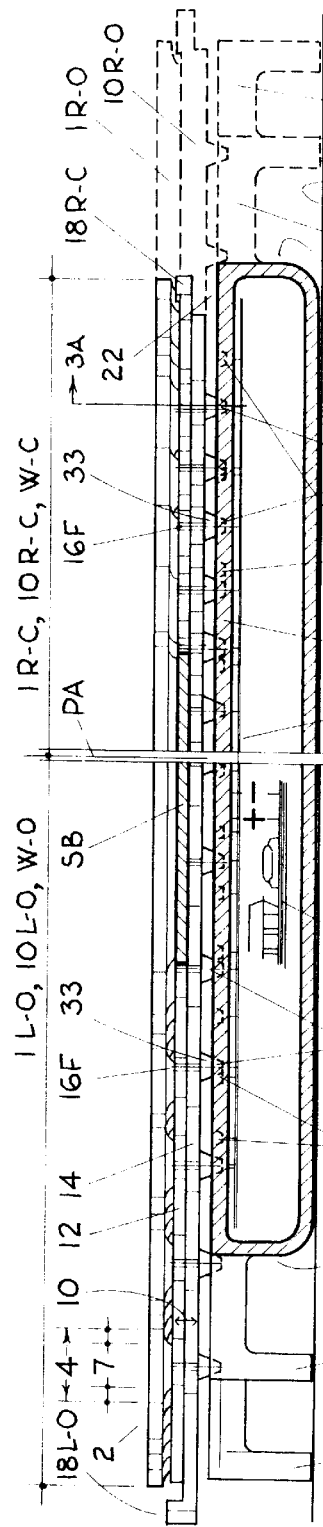
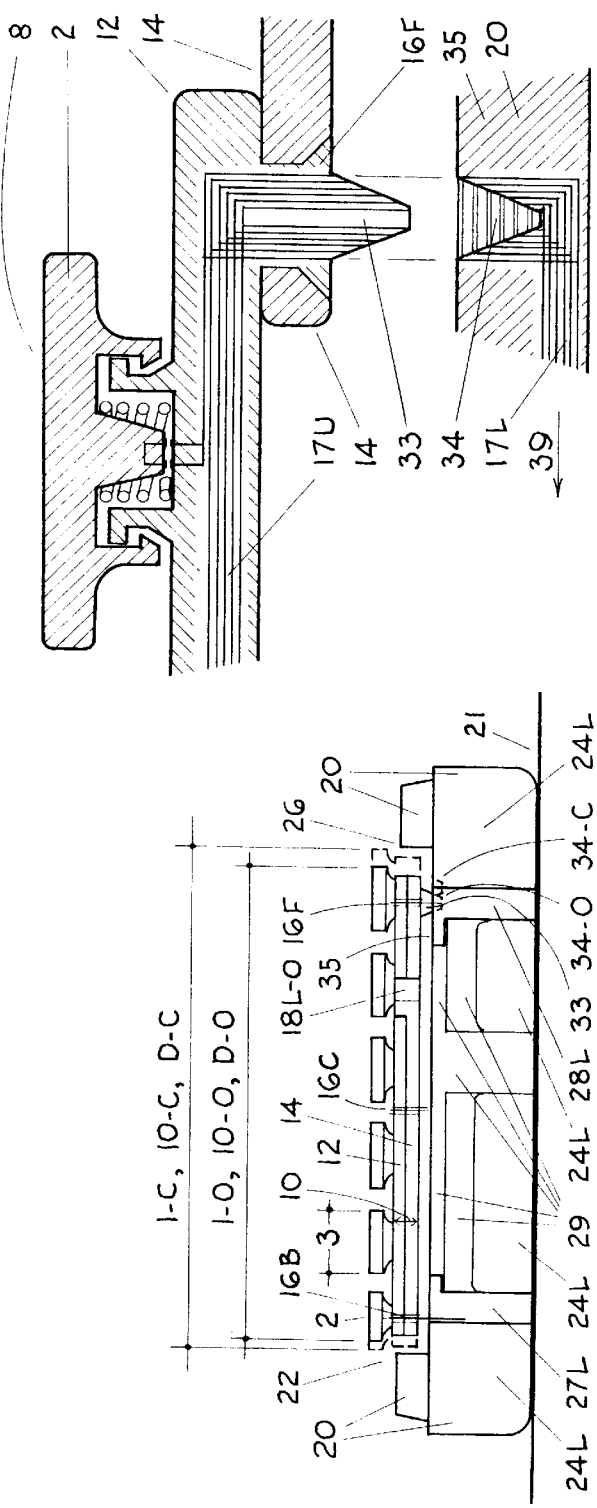

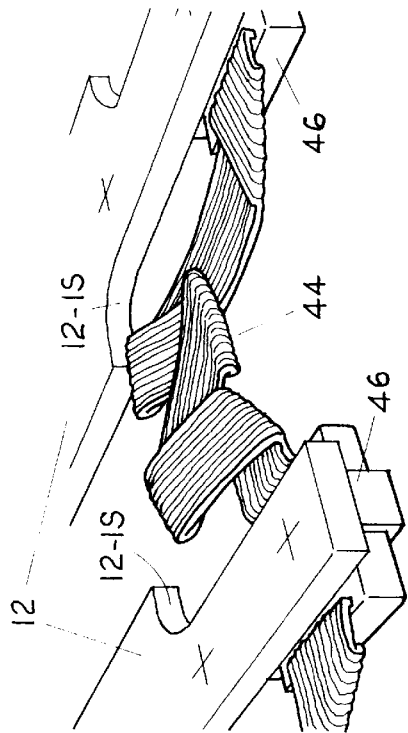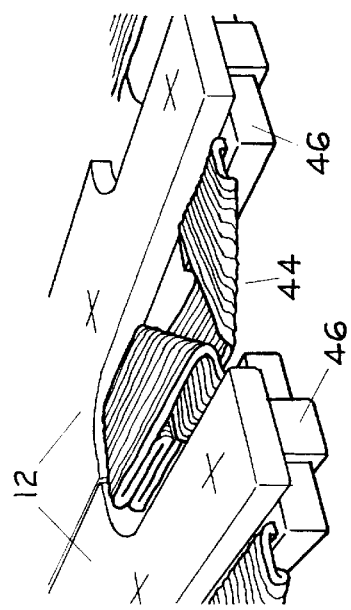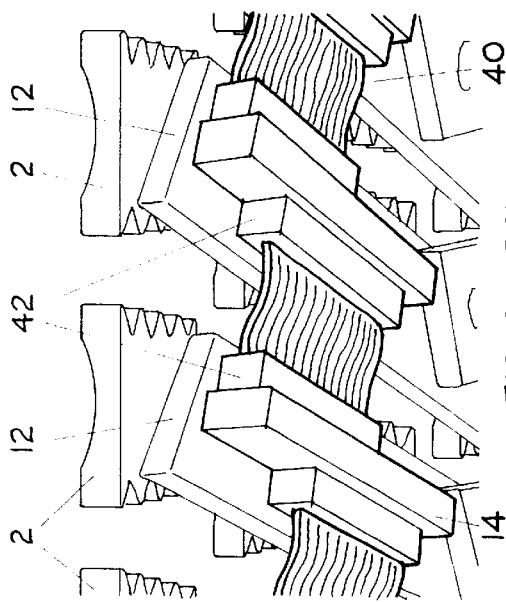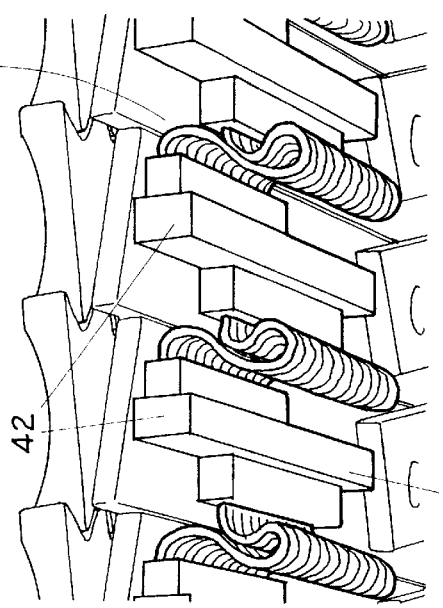

FIG. 8-OPEN

FIG. 8-CLOSED

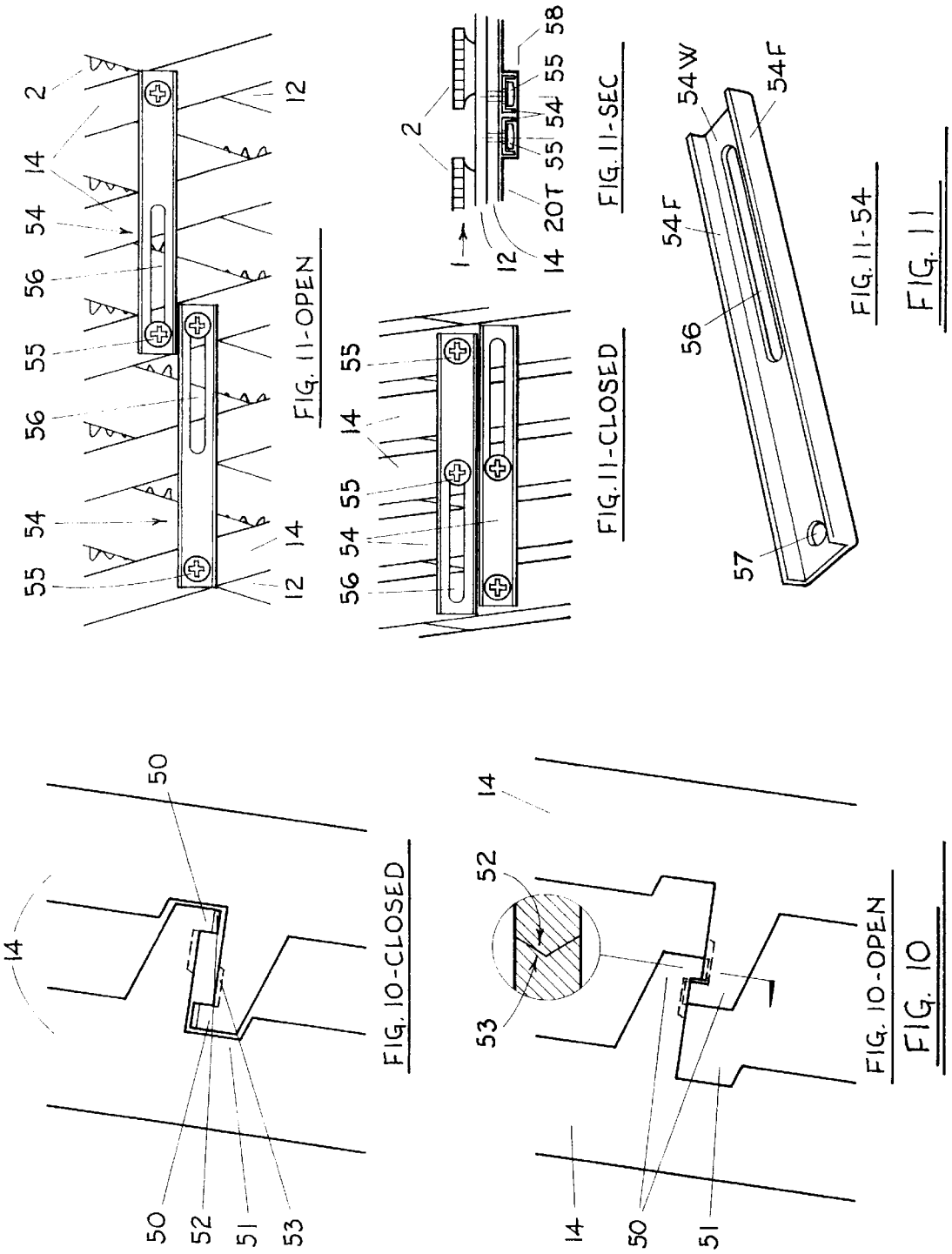

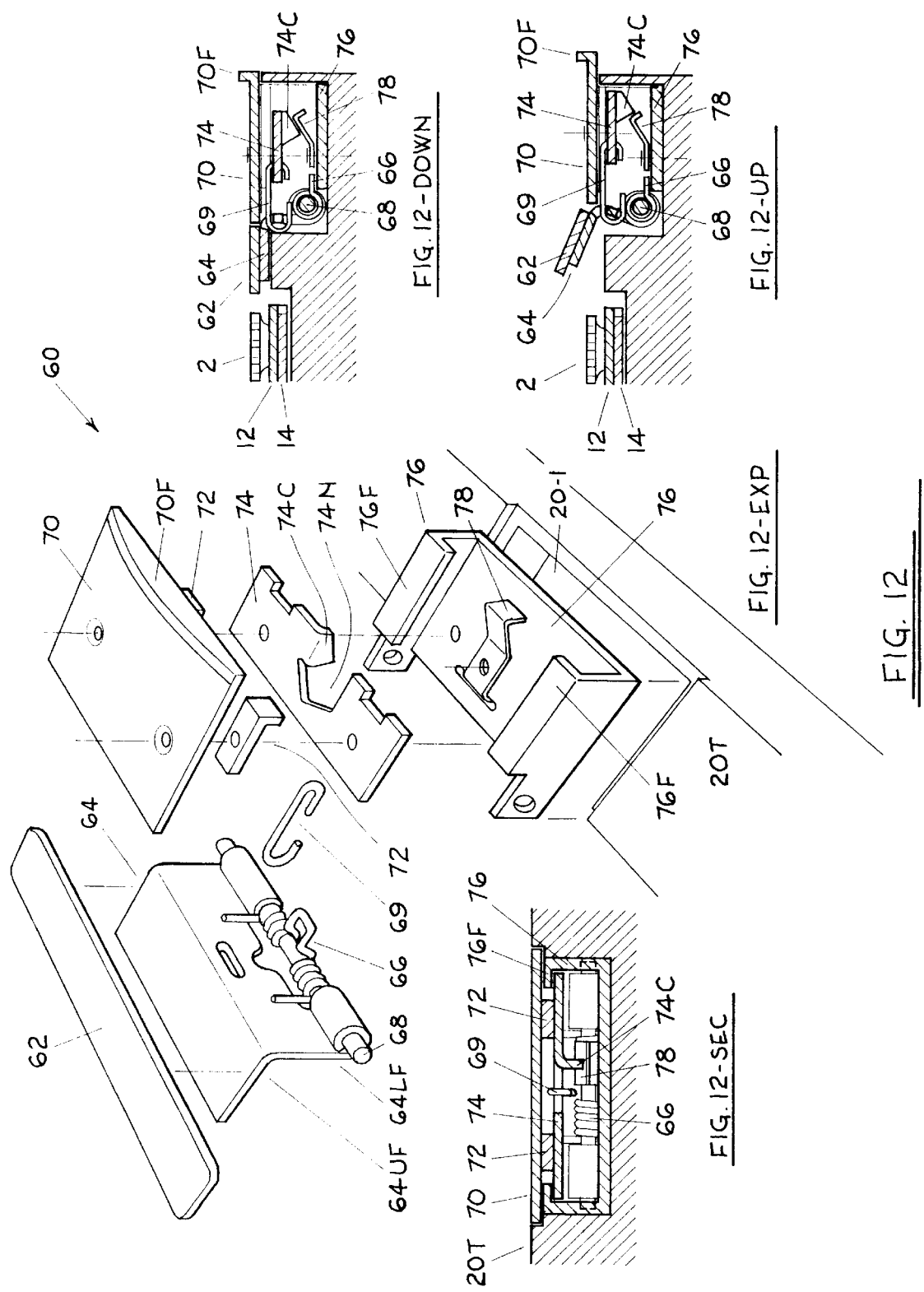

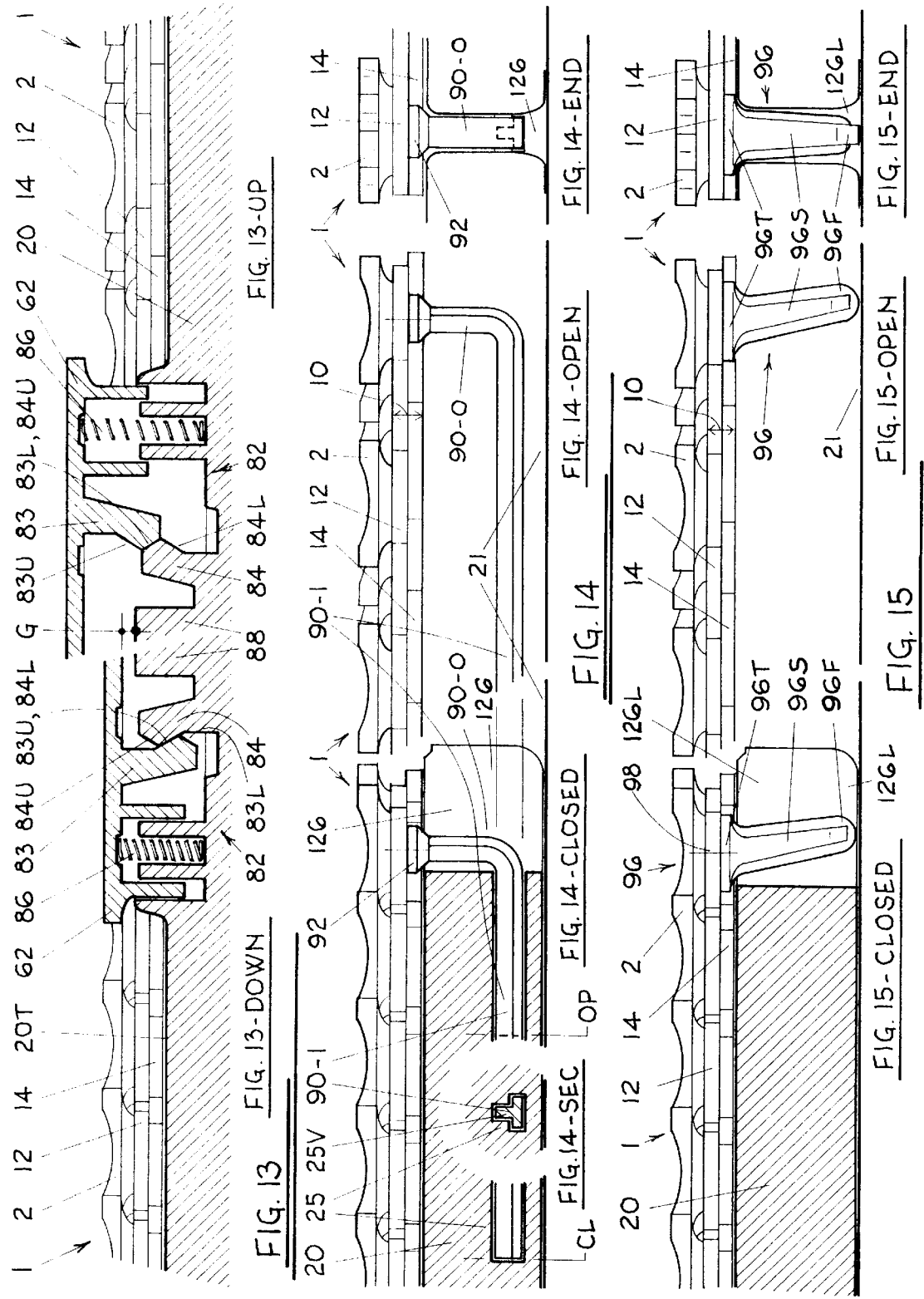

EXPANDABLE KEYBOARD INCLUDING FLEXIBLE FLAT CABLE CONDUCTORS

This is a Continuation In Part (C.I.P.) of a patent whose original filing date was Mar. 18, 1998, and whose Serial Number is Ser. No. 09/040,550, now U.S. Pat. No. 5,938,353.

FIELD OF THE INVENTION

This invention relates in general to the use of small computers and other lightweight or mobile electronic devices that receive data input by alphanumeric or operational means.

BACKGROUND OF THE INVENTION AND PRIOR ART

This is a Continuation In Part (C.I.P.) of a present patent Pending whose filing date was Mar. 18, 1998, and whose Serial Number is Ser. No. 09/040,550, now U.S. Pat. No. 5,938,353.

Throughout the 1990s the computers that millions of people worldwide now use in their offices and homes have improved at an amazingly rapid rate, to the point that the power and mobility these devices now bring to their users is truly breathtaking. In particular, the amount of work they can do has greatly increased while at the same time their size has steadily decreased, the latter to the point that today a capacious and multifunctional computer can be made that is no bigger than a common videocassette. But such devices have one major limitation: their keyboard keys are presently so tiny and so close together that it is virtually impossible to enter data into them at typical secretarial speed for any length of time. Indeed, in February 1998 one research manager for a major computer maker (Celeste Baranaski of Hewlett-Packard) said: "Unless some breakthrough is made in keyboard technology, many of these smaller travel keyboards just won't work." And in that same month a journalist (David MacNeill of *Pen Computing Magazine*) said of present palmtop computers that their "Inappropriate input methods, such as tiny QWERTY keyboards, hobble us in our attempt to enter our information into a device, wasting our time, and even causing physical pain." Indeed, even a slight reduction in a keyboard's width may significantly reduce a typists speed—as then the keys are arranged differently than the standard spacing at which one may be accustomed to typing.

However, a few inventors have long been aware of this potential deficit of typewriters, computers, laptops, palmtops, calculators, and other alphanumeric or operational input devices that are designed with versatility and mobility in mind. For example, in 1974 George Margolin in his U.S. Pat. No. 3,940,758 described an EXPANDABLE KEYBOARD FOR ELECTRONIC POCKET CALCULATORS AND THE LIKE, in which "a keyboard of familiar layout for a full-size desk top data terminal is organized in three modular portions," which when closed said three modular portions are arranged in a stacked position as shown in FIG. 7 of Margolin's patent. But it is obvious that Margolin's invention, while reducing the surface or 'footprint' area occupied by a standard desktop keyboard by about two-thirds, does so at a sacrifice of triply increasing the keyboard's depth, so that such a device could hardly be carried like a videocassette in one's pocket or purse. Then in 1991 Adrian Crissan in his U.S. Pat. No. 5,187,644 described a COMPACT PORTABLE COMPUTER HAVING AN EXPANDABLE FULL SIZE KEYBOARD WITH EXTENDIBLE SUPPORTS, in which the outer quarters of his keyboard comprise "a pair of fold-out flaps containing a portion of the keys" which can be rotated upward and inward so that when in closed position said outer quarters lay flat upon the middle half of the keyboard. But this arrangement also considerably increases the parent unit's depth by the thickness of its folded-over portions, as is obvious from examination of FIG. 1 of Crissan's patent. A number of other patented keyboards (see esp. Classes 400/88 and 400/682) have their keys arranged in ways that slide to the side or open to the front in various ways, but none of them truly reduce the footprint size of the parent unit as do the two above-cited patents, nor do they simultaneously allow the parent unit to achieve an approximately videocassette size in all dimensions as does the Disclosed Invention. A further deficit of Margolin's and Crissan's patents is that when the outer portions of their keyboards are folded onto their central portions as they are closed, all the keys become concealed in a way that keeps any from being used when the keyboard is closed.

SUMMARY OF THE INVENTION

If one looks at a standard keyboard, he or she will note that a significant amount of space exists between the raised side edges of any pair of adjacent keys. In a standard keyboard with 'Chiclet' style keys and a standard 19 mm pitch (center-to-center dimension between two adjacent keys), these intervening voids are usually about one-half the width of each key's top or tactile surface. Thus if these voids could somehow be maintained when the keys were in standard or 'open' position, yet eliminated when the keys were in contracted or 'closed' position, a keyboard's total width could be reduced by about one-third when closed; then if the sides of each key were given some kind of indented profile so that each pair of adjacent keys would interlock when closed, the distance between their centers could be further reduced, until a 28≧29 cm wide standard keyboard could easily be fitted into less than the 18–19 cm length of a common videocassette—at no increase of depth. This is what the Disclosed Invention does. Specifically, its keys' side edges have indented profiles that enable any two adjacent keys to interlock at a closer pitch than can occur with normally sided keys, then its keys are mounted on a laterally flexible assembly, hereinafter described as a scissor-linkage, comprised of a multiple-X matrix of supporting microbusbars and interconnecting braces, in which the microbusbars carry the electrical code from the depressed keys mounted on their tops, and the braces interconnect the microbusbars and stabilize them and the keys above. The microbusbars also have positional guides beneath their front ends that keep the keyboard from sliding or moving out of place whether it is in open or closed position, and these guides have electrical contacts that conduct the electrical code from the keys' microcircuitry to the computer's operational circuitry located outside the invention, also whether the keyboard is open or closed. The Disclosed Invention's total assembly of keyboard and scissor-linkage is also thin, so its depth alone will not seriously impact the depth of the parent device in which it is installed.

The utility of the Disclosed Invention is further enhanced by certain means of trigonometric trickery that seem to deceive the eye. For example, when the scissor-linkage's sides are extended laterally from closed to open position, its front-to-back or longitudinal dimension must necessarily decrease; but surprisingly, when its lateral dimension is increased from 17.7 to 27.8 cm—more than 57 percent—its front-to-back dimension decreases by only 9.36 to 9.13 cm—hardly 2 percent. Indeed, at the above dimensions (which were taken from a working model made by the inventor), the disclosed keyboard's surface area when in open position is actually 53 percent greater than when closed. Thus this keyboard, while greatly increasing the width of its keys when extended to open position, does not create rows of keys whose fronts and backs become too close together when open nor does it seriously affect the longitudinal dimension of its parent device when closed. Another trigonometric trick of the Disclosed Invention's scissor-linkage is that when it contracts, the keys mounted on it rotate slightly, which allows the keys' indented side edges to interlock in a manner that enables said keys to have the same side-to-side symmetry as, and even greater corner-to-corner dimensions than, those of normal keyboard keys—qualities that make the disclosed keyboard more interestingly attractive as well as easier to use.

Subsequent to this patents original filing date, the inventor has made numerous improvements to the Disclosed Invention, as described below:

As originally filed the Disclosed Invention includes a certain matrix of electrical conductors that underlies the keys and carries their electrical code through electrical contacts on their undersides of their microbusbars to the parent computer. However, this matrix of conductors has been improved as follows:

If one examines the matrix of microcircuitry that underlies the keys of a standard computer keyboard, one will find in addition to numerous horizontal and vertical segments of wiring all sorts of diagonal and curving segments, of which the latter are not really adaptable to the arrangement of "essentially parallel and equidistant microbusbars as described in" the Disclosed Invention as originally filed. On the other hand, the wiring matrix that underlies a common digital-dial telephone's four-by-three-row arrangement of 12 keys (10 numerals plus the # and * keys ) is a simple arrangement of four horizontal and three vertical wires. Now, considering that the keys of the Disclosed Invention are arranged in distinctly horizontal rows (i.e. the A S D F G H J K L ; ' keys) and near-vertical columns (i.e the microbusbars oriented as \\\\\, of which the F3-3-E-E-C keys comprise one such column, a typical digital phone wiring matrix can be enlarged and its top inclined slightly to the left so its horizontal and 'vertical' wires will align with the keyboard's rows of keys. Then, since a number of these hair-sized conductors can easily be arranged as they are on computer circuitboards within the width of a microbusbar (especially if these bars are widened as described further below), the horizontal wires on each busbar may extend upward along the sides of the keys and converge at a collector locus near the top of the bar, from where a flexible multiple microconductor known as "ribbon wire" or "flat cable" can span the varying distance to a mating collector area near the top of the adjacent busbar. Such flexible multiple microconductors are found in many of today's computers and their printers, two examples being the flexible flat cable that extends from a laptop computer's base through its hinged top to its LED display, and the ribbon cable that extends from an ink-jet printer's processor to its ink-cartridge assembly (these latter cables are so flexible and durable that much of their 14-inch length is bent almost 180° every second as the ink-cartridge assembly dashes back and forth across each page as the printer operates). Next, suppose the keyboard is divided into three parts: (1) a central spine bar that is the microbusbar that supports the keys F6 6 Y H N, (2) the leftmost keys that lie to the left of the spine bar, and (3) the rightmost keys that lie to the right of the spine bar. Now, considering only the leftmost keys for the moment, these keys have 6 horizontal rows and 6 near-vertical rows. Thus, adapting the digital phone wiring matrix described above, these keys can have 6 horizontal wires and 6 near-vertical wires underlying their rows and columns, then on each microbusbar each horizontal wire turns upward at the sides of each key and the vertical wires turn to the right at the bar's top in a manner that leads all the wires to a collector locus near the top of the bar; then from here the wires (plus possibly an incoming power and/or ground wire) extend via a flexible flat cable to a mating collector locus on the busbar adjacently to the right, and in this manner a series of flat cables extends from busbar to busbar until it ends at a mating collector locus near the top of the spine bar. Such a matrix comprises the microcircuitry for the leftmost keys of the keyboard, and a similar matrix of microcircuitry for the rightmost keys is for the most part a mirror image of that of the leftmost keys. Then all the leftmost and rightmost wires (plus the near-vertical wire for the spine bar's keys) extend from the top of the spine bar to its bottom, where, since the bar's bottom moves hardly at all as the keyboard opens and closes, a final flexible flat cable connects all the keyboard wires (plus a wire from the spacebar) to an XY decoder situated beneath the spacebar. Then from the XY decoder a pulse train of binary code from all the keys enters the computer where this data is processed into the characters that appear on the display.

The chief advantage of this microcircuitry matrix as described above is not only its improved nature but its articulation. Although the Disclosed Invention's patent as originally filed described a means of conducting electrical code from the keyboard to the parent computer, it did not articulate the exact nature of this circuitry other than "a typical schematic of the microcircuitry" in part of one microbusbar and the computer immediately below. And prospective manufacturers of the Invention have wanted to know more than that the electrical code can conduct from the accessory to the parent device, they want to know how, and their interest in the Disclosed Invention will remain nascent until they have this information. Thus this Continuation in Part includes a microcircuitry map of the keyboard and claims related thereto.

An important aspect of the above-described microcircuitry is the design of the flexible flat cables that conduct the keys' electrical code from busbar to busbar to the XY decoder beneath the spacebar whether the keyboard is open or closed. These conductors may have at least three separate but equally efficacious embodiments: (1) A straight flexible flat cable extends from under the top of one busbar to a mating area under the adjacent bar, so that when the keyboard is open the cable extends somewhat flatly between the bars and when the keyboard is closed the cable droops between the bars. (2) A flexible flat cable folded into a roughly "W" shape whose ends are connected to indents in the adjacent sides of two microbusbars, then its configuration enables its flexure to occur generally in its plane of movement as the keyboard opens and closes. There are many possible variations of this type of cable. In fact, conductor 1 may be given a few accordion-like pleats or folds to reduce the depth of its ride. (3) Conductance via wireless means. By locating on each busbar a small microchip with a drive circuit that activates an adjacent sender photodiode, then locating on the adjacent busbar a mating microchip and receiver photodiode, a series of wireless sender/receivers can carry the electrical code from busbar to busbar on to the XY decoder under the spacebar. The chief advantage of all three conductors is that they give prospective manufacturers more flexibility in assembling the Disclosed Invention according to their own design criteria and inclinations.

As originally filed the Disclosed Invention's keyboard establishes its minimum width when closed by having the sides of its keys touch each other as they interlock. But then any depressed key would likely activate any adjacent key it touched. However, if each microbusbar is widened until it is about 1/32 in. or 0.8 mm wider than the narrowest width of each key, the keyboard's width when closed will be set by the busbars' abutting edges, which will also keep the keys slightly apart when the keyboard is closed. The wider busbars can also hold a given number of microconductors more easily, they provide a wider anchor for the keys, and they enable themselves to be thinner while remaining just as strong which creates a thinner computer. Also, the scissor-linkage's braces can be made wider as described above instead of the busbars.

As originally filed the Disclosed Invention's keyboard has no means of limiting its maximum width when open, other than "the movable positional guides on the undersides of the microbusbars that serve to accurately locate the keys." But these positional guides do not solve a 'linkage-lag' problem which the Invention's prototypes built subsequent its patent's original filing date have revealed: when the closed keyboard is opened, the outer busbars tend to spread even wider than their 19 mm spacings before the central bars even begin to spread apart, even if the scissor-linkage is precisely assembled. However, if integral hooks are situated on the sides of the scissor-linkage's braces as shown in FIG. 11 of the Drawings, said hooks will rotate slightly as the keyboard opens and interlock when the keys are 19 mm apart. Another way to achieve the same is to locate rows of sliding slotted stops on the braces' undersides as shown in FIG. 12 of the Drawings. Both these limiters not only establish the exact 19 mm key-to-key pitch that equates this keyboard's open position with standard desktop keyboards, they also eliminate the "linkage-lag" problem described above.

As originally filed the Disclosed Invention has only two positions: open and closed. However, certain embodiments of the Invention can have positional guides that articulate an intermediate setting between these two positions, for purposes of making the Invention more useful for children with little hands whose fingers might not easily reach a keyboard's normally-spaced keys. This feature could have significant ramifications in the field of elementary education.

As originally filed the Disclosed Invention makes no mention of any movement of the spacebar. However, in certain embodiments of the Invention this elongate key may need to lift upward slightly to allow the keyboard to slide more freely as it opens and closes, and/or this key may need to push downward and hold the keyboard secure while it is being used. Such lifting and clamping can be achieved by installing a spring mechanism with a small handle on top directly in front of the spacebar, so that when the handle is moved one way it raises the spacebar and when it is moved the other way it pushes the spacebar down. Another means of doing the same is for the spacebar to spring up slightly as the keyboard is opened or closed, then the bar is pushed back down before the keyboard is used.

As originally filed the Disclosed Invention has four supports on the computer's sides which are swung outward before the keyboard is opened so they can hold up the outermost keys that protrude beyond the computer's sides; then after the keyboard is closed, the supports swing back into the computer's sides. But a simpler way to provide the same support is to place under the keyboard's corners four small outriggers that are inside the computer when the keyboard is closed, then as the keyboard is opened these little cantilevers slide directly out under the outermost keys to support them. Even simpler is to locate under each corner of the keyboard four tiny legs that also slide out as the keyboard is opened. Though the legs occupy less room inside the computer than the outriggers, the outriggers allow the keyboard to be used on one's lap or any small uneven surface whereas the legs' tips must rest on the same plane as does the computer's underside. The advantage of the outriggers and legs is that, unlike the originally disclosed supports, they require no extra movements to locate them when the keyboard is opened or closed.

Taking all the above into consideration, the primary advantage of the Disclosed Invention is that it allows 'laptop' and 'palmtop' computers and similar lightweight or mobile electronic devices with alphanumeric keyboards to be made small enough to fit into a jacket pocket or purse while allowing their keyboards to be as comfortably usable as those of full-size desktop computers. Such economies of size should lead to corresponding economies of price.

A further advantage of the Disclosed Invention is that its keys remain fully operable even when in closed position—an advantage that cannot be enjoyed with the above-cited U.S. Pat. Nos. 3,940,758 and 5,187,644. Thus the Disclosed Invention retains one of the greatest advantages of palmtop computers—that a standing user can hold such a device in a single hand while operating its keys with a few fingers or a pen held in the other hand, allowing such a user to easily operate such a device while walking down a hallway, interviewing someone, inventorying shelved merchandise, or even while standing on a moving walkway in an airport.

A further advantage of the Disclosed Invention is that its keyboard and underlying scissor-linkage can possibly be extended to a width that is three or four times greater than its prescribed open position, in which such extension considerably reduces the assembly's longitudinal depth which pulls the front keys back, exposing the positional guides and/or electrical contacts normally beneath the front ends of the microbusbars, enabling said guides or contacts to be easily cleaned if necessary.

A further advantage of the Disclosed Invention is that the deeply profiled edges of its individual keys may serve as a more tactile aid to a typist than the usual smooth-edged keys, which may lead to speedier and more accurate data entry.

A further advantage of the Disclosed Invention is that the underside of its keyboard may have small positional guides which articulate an intermediate setting between the keyboard's open and closed positions, so that children with little hands whose fingers may not be able to reach a keyboard's normally-spaced keys may more comfortably use this device.

A further advantage of the Disclosed Invention is that it may eliminate the tendency of present makers of palmtops and other small computers to remove certain keys which may be important to some users of desktop models in efforts to create a more compact keyboard.

A further advantage of the Disclosed Invention is that it allows computers of present desktop or laptop capability to be made much more lightweight. For example, the leanest laptop computers today still weigh two or three kilograms, which when carried in a traveler's shoulder bag for several hours can become quite uncomfortable; and such units certainly cannot be carried easily in one hand. On the other hand, several of today's palmtops—some of which have 16 MB of RAM, 256-color displays, PC card slots, serial interfaces, and built-in batteries and allow one to "run WINDOWS® anywhere" and communicate via Email— weigh less than 1 kilogram. Such units (typical dimensions= 20×12×3 cm) also take up less than 20 percent of the volume of their typically 30×22×6 cm laptop counterparts.

A further advantage of the Disclosed Invention is that the keys' deeply indented profiles may impart an eye-catching character to the device in which they are installed, which should make such devices highly marketable.

A further advantage of the Disclosed Invention is that it has more applications than being mounted on top of small computers. For example, several of the numerous representatives of companies who have recently shown an interest in this invention have expressed a desire to adapt it so that palm-sized pen-input devices (commonly known today as "PALMPILOTS®" and "PDAs") can plug into the back of this "portable open-and-close keyboard"—in which the Disclosed Invention would become a handy stand-alone item hardly bigger than a cigaret case. And a maker of "ruggedized notepads", an electronic writing tablet about 5×8½ inches in size, expressed a desire to install this open-and-close keyboard under his tablet's display, so he can pull the closed keyboard out from under the display then open the keyboard and start typing as he were at a desktop computer. Similar ideas from such representatives indicate that this product may have a number of other computer-related applications.

Although great latitude exists regarding the optimal sizing and configuring of many of the Disclosed Invention's various elements—for example the design and arrangement of keyboard keys, footprint dimensions of the keyboard when closed, method of conducting electricity from the keys to the computer, nature of supporting the outermost keys when the keyboard is open, and many more such details—in which any one of such various elements when considered individually may not necessarily represent a particular embodiment of its portion of the Invention as described herein, yet each of such various elements of the Disclosed Invention when considered collectively may be said to have one or more particular embodiments, as follows:

BRIEF DESCRIPTION OF THE DRAWINGS

FIG. 2 is a section through the parent computer showing the front of the keyboard and its underlying scissor-linkage with the left half of both shown in open position and the right half of both in closed position.

FIG. 3 is a left side view of the keyboard and its underlying scissor-linkage shown in open position in which the back and front edges of both when closed (1-C and 10-C) are shown in dotted lines. A right side view of this assembly is essentially a mirror image of the left side view.

FIG. 3A is an enlarged section thro' one of the scissor-linkage connectors which in this embodiment of the Disclosed Invention also serves as a positional guide and electrical contact between the Disclosed Invention and the computer below, in which a typical schematic of the microcircuitry from any key to the computer's operational circuitry is also shown.

FIGS. 6-OPEN and 6-CLOSED show open and closed views of a straight flexible flat cable which in this particular embodiment is connected to adjacent microbusbars in open and closed position.

FIGS. 7-OPEN and 7-CLOSED show open and closed views of a W-shaped flexible flat cable which in this particular embodiment is connected to adjacent microbusbars in open and closed position.

FIGS. 10-OPEN and 10-CLOSED show open and closed views of two adjacent braces with integral hooks or latches on their sides which in this particular embodiment limit the keyboard's maximum width when it is open.

FIG. 11 includes four views of sliding slotted stops: FIGS. 11-OPEN, 11-CLOSED and 11-SEC show open, closed, and sectional views of the rows of sliding slotted stops on the scissor-linkage's underside which in this particular embodiment limit the keyboard's maximum width when it is open. FIG. 11-54 is an enlarged view of one sliding slotted stop.

FIG. 12 includes four views of a spacebar handle assembly which in this particular embodiment enables the spacebar to lift up to facilitate opening and closing the keyboard and/or holds the keyboard secure when it is being used. FIG. 12-EXP is an exploded view of this assembly, FIG. 12-UP is a section thro' said assembly when the spacebar is lifted up, FIG. 12-DOWN is a section thro' said assembly when the spacebar is down, and FIG. 12-SEC is a lateral section thro'said assembly with the spacebar down.

FIG. 13 includes two views of a spacebar: FIGS. 13-DOWN and 13-UP are sections thro' the right and left halves of the spacebar that show a spring mechanism beneath it which moves this key slightly upward when the keyboard is opened or closed.

FIG. 14 includes four views of an outrigger: FIGS. 14-OPEN and 14-CLOSED show open and closed views of an outrigger which in this particular embodiment supports the outermost portions of the keyboard when it is open. FIG. 14-SEC is a section thro' the outrigger's inner end in closed position, and FIG. 14-END is an end view of the outrigger assembly in open or closed position.

FIG. 15 includes three views of a leg: FIGS. 15-OPEN and 15-CLOSED show open and closed views of a leg which in this particular embodiment supports the outermost portions of the keyboard when it is open. 15-END shows an end view of the leg as it appears in open or closed position.

FIGS. 1 to 4 above appeared in the Disclosed Invention's original patent, while FIGS. 5 to 15 above appear as a previously undisclosed portion of this Continuation in Part. In FIGS. 1 to 15 above, the following numbers and letters are used to denote various parts of the Disclosed Invention:

1. Keyboard (left side in open position=1L-O, right side in closed position=1-RC, right side in open position=1R-O).
2. Individual key in keyboard 1. In FIG. 5 each key is also denoted by the actual letter it is typed and the letter is placed within a circle; i.e. the "T" key appears as (T).
3. Longitudinal (front-to-back) depth of any key 2.
4. Total lateral (side-to-side) width of any key 2.
5. Side edge of key 2.
6. Indented profile of key 2.
7. Minimum indent width of key 2.
8. Top or tactile surface of key 2.
10. Scissor-linkage (left side in open position=10L-O, right side in closed position=10R-C, right side in open position=10R-O).
11. Spinebar: centermost microbusbar 12 in keyboard 1.
12. Microbusbar of scissor-linkage 10 (indent in side of microbusbar=12-IS); also busbar or bar.
14. Brace of scissor-linkage 10.
16. Connectors of microbusbar 12 and brace 14 (back connector=16B, center connector=16C, front connector=16F.
17. Microcircuitry (in Disclosed Invention=17U, in parent computer=17). Also microconductor.
18. Scissor-linkage handles (left handle in open position=18L-O, right handle in closed position=18R-C).
19. Indent on each scissor-linkage handle 18.
20. Computer body (top=20T, indent that receives spacebar handle assembly 60=20-I). Also frame of computer or computer frame.
21. Surface that computer rests upon; also computer's resting surface or surface that supports computer as it is being used.
22. Back of computer frame 20.
24. Side of computer frame 20 (left side=24L, right side=24R).
25. Outrigger encasement: portion of computer body 20 that envelops sliding end of outrigger 90 when outrigger 90 is in closed position (encasement void=25V).
26. Front of computer frame 20.
27. Back keyboard supports (left side in open position=27L-O, right side in open position=27R-O). Also upper keyboard support.
28. Front keyboard supports (left side in open position=28L-O, right side in open position=28R-O). Also lower keyboard support.
29. Keyboard support indent in side of computer body 20.
33. Projecting positional guide on underside of connector 16F.
34. Indented positional guides in computer chassis 35 (guide that receives projecting guide 33 when keyboard is in open position=34-O, guide that receives projecting guide 33 when keyboard is in closed position=34-C).
35. Computer chassis.
39. Circuitry inside computer body 20.
40. Flexible flat cable conductor.
42. Plug at end of flexible flat cable conductor.
44. W-shaped flexible flat cable conductor.
46. Plug at end of W-shaped flexible flat cable conductor.
48. Infrared (IR) or wireless driver microchip with drive circuit Also driver microchip or driver chip.
49. Infrared (IR) or wireless photodiode (sender photodiode=49S, receiver photodiode=49R).
50. Integral hook or latch on side of brace 15.
51. Indent on side of hook 50.
52. Projecting face in side of hook 50 that mates with indented surface 53 in side of adjacent or interlocking hook 50.
53. Indented surface in side of hook 50 that receives projecting face 52 in side of adjacent or interlocking hook 50.
54. Sliding slotted stop (web of ∞=54W, flange of ~=54F); also slotted stop, sliding stop, or stop.
55. Screw or similar connector that fastens sliding slotted stop 54 to brace 14.
56. Elongate hole in end opposite hole 57 in web 54W of sliding slotted stop 54.
57. Hole in end opposite elongate hole 56 in web 54W of sliding slotted stop 54.
58. Shallow trench in computer top 20T that provides riding room for sliding slotted stops 54.
60. Spacebar handle mechanism or assembly.
62. Spacebar; also spacebar key or key. This part is also number SB.
64. Spacebar base (upper flange=64UF, lower flange=64LF).
66. Double torsion spring in lower flange 64LF of spacebar base 64.
68. Shaft that fits into lower flange 64LF of spacebar base 64.
69. Connector between spacebar base 64 and handle 70.
70. Handle that raises or lowers spacebar 62 (handle lever=70F).
72. Spacers between handle 70 and handle base 74.
74. Handle base (notch=74N, downward-projecting catch=74C).
76. Handle case (side flanges=76F).
78. Catch spring in handle case 76.
82. Spring/catch mechanism beneath spacebar 62.
83. Upper catch projecting down from underside of spacebar key 62 that engages lower catch 84 (upper face that mates with lower face 84L=83U, lower face that mates with upper face 84U=83L).
84. Lower catch projecting up from computer top 20 that engages upper catch 83 (upper face that mates with lower face 83L=84U, lower face that mates with upper face 83U=84L).
86. Spring that pushes spacebar 62 up.
88. XY decoder.
90. Outrigger that supports outermost keys 2 when in open position (inner or sliding end=90-I, outer or supporting end=90-O).
92. Connector between outrigger 90 and underside of scissor-linkage 10.
96. Leg that supports outermost keys 2 when open (top=96T, shaft=96S, foot=96F).
98. Connector of leg 96 to underside of scissor-linkage 10.
126. Inset in computer body 20 that receives outrigger 90 (inset that receives leg 96=126L).
A. Top view of standard keyboard key.
D-O. Longitudinal depth (front-to-back dimension) of keyboard 1 when open.
D-C. Longitudinal depth (front-to-back dimension) of keyboard 1 when closed.
CL. Closed position of innermost part of outrigger inner end 90-O.
G. Gap between spacebar's normal resting position and its lowermost position during normal typing activity.
OP. Open position of innermost part of outrigger inner end 90-O.
PA. Pivot anchor of keyboard 1 and scissor-linkage 10 located approximately under key F7.
S. Small space between the sides of two keys 2 when keyboard 1 is closed.
SB. Spacebar located in central front part of keyboard 1. This part is also no. 62

W-O. Lateral width (side-to-side dimension) of keyboard 1 when open.

W-C. Lateral width (side-to-side dimension) of keyboard 1 when closed.

X. X or predominantly horizontal microconductors in microcircuitry 17 (these conductors are also numbered X1, X2, X3 . . . X6). Also conductors or wires.

Y. Y or predominantly vertical conductors in microcircuitry 17 (these conductors are also numbered Y1, Y2, Y3 . . . Y7). Also conductors or wires.

DETAILED DESCRIPTION AND OPERATION OF THE INVENTION

Figure 1:
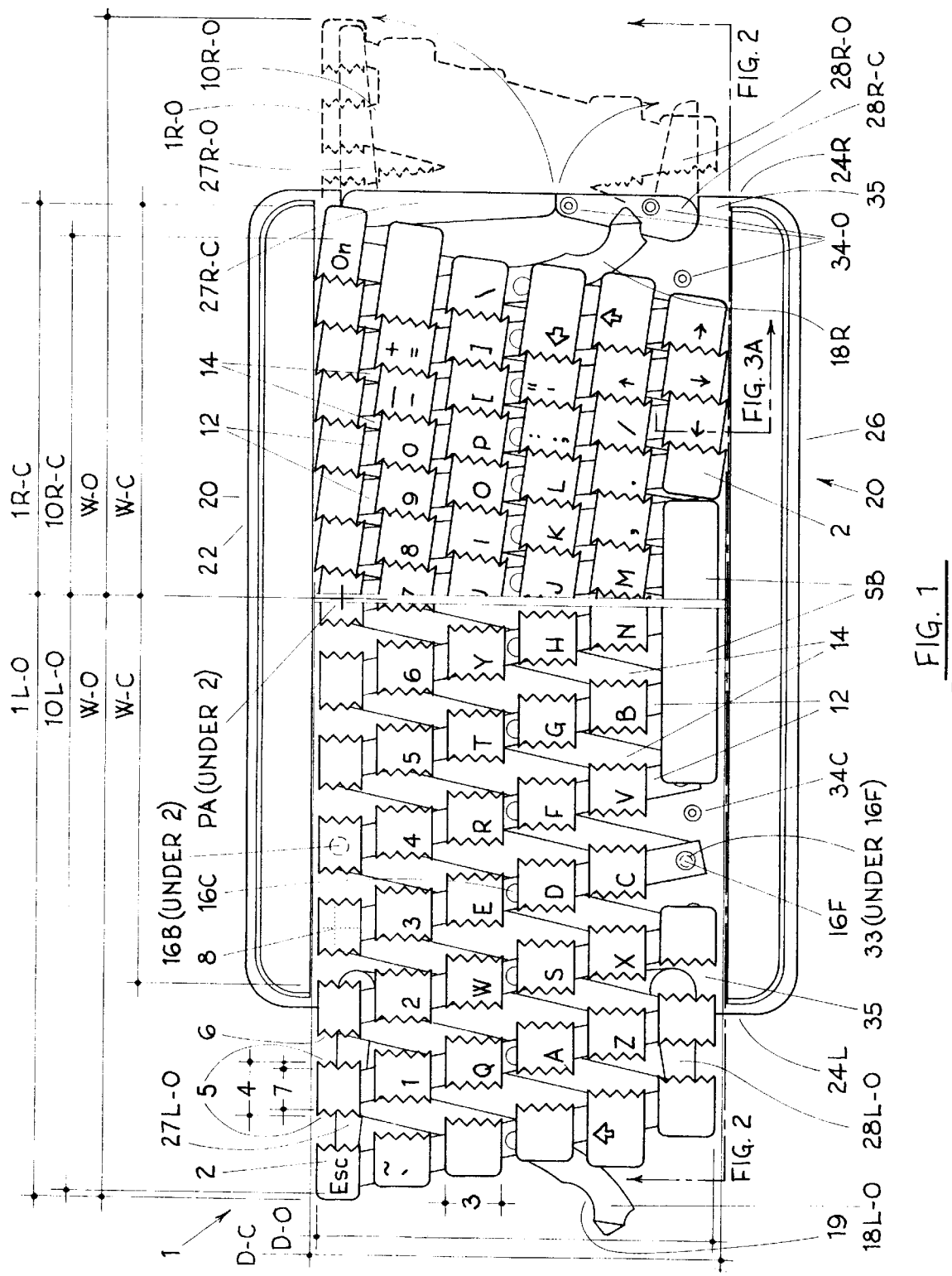
FIG. 1 is a top view of the keyboard and its underlying scissor-linkage with its left half in open or expanded position and its right half in closed or contracted position.

Referring to the accompanying Drawings that describe a preferred embodiment of the Disclosed Invention in detail and initially to FIG. 1 thereof: This top view shows the left half of keyboard 1 and its underlying scissor-linkage 10 in extended or open position and its right half in contracted or closed position, in which the division between the two halves occurs at the centrally located pivot anchor PA (described in greater detail below), in which each key 2 (not including space bar SB centered in the bottom row) has a typical alphanumeric or operational notation on its top or tactile surface 8. In this Figure, note that the keyboard's front-to-back dimension decreases only slightly from D-C to D-O as its lateral or side-to-side dimension increases greatly from W-C to W-O when the keyboard is extended from closed to open position. This figure also shows in dotted lines the outline of the right half of said keyboard and scissor-linkage when open (1R-O and 10R-O) and the outlines of the two legs 27R-O and 28R-O that extend from the computer's right side to support this side of the keyboard when open.

Referring to keyboard 1: each key 2 has a longitudinal (front-to-back) depth 3, total (side-to-side) width 4, and side edges 5, with at least one of side edges 5 having an indented profile 6 that allows any two adjacent keys to interlock at an indent width 7 which is less than each key's total width 4. Indent width 7 allows the total width 4 of each key's top surface 8 to remain the same as the full width of standard-sized keyboard keys when each key 2 is in open position, yet said indent widths 7 also enable the center-to-center dimensions of any two adjacent keys 2 to be considerably less than those of two normal keyboard keys placed side-to-side. Regarding spacebar SB, this elongate key centered in the bottom row of keys is connected to computer body front 20F so its typing surface remains in the same place whether all the other keys 2 are extended or contracted around it, in which such extension of keys 2 causes said keys 2 to rotate slightly (which would be desirable for them as explained further below) while such rotation would be undesirable for the elongate spacebar SB. However, in other equally useful embodiments of the invention, spacebar SB could have one end (or its center) rotatably anchored to one part of the underlying scissor-linkage 10 and its other end (or both ends) slidably anchored to other parts of scissor-linkage 10, or be mounted in some other way to either scissor-linkage 10 or computer body 20, in order to keep it from rotating as keyboard 1 is opened or closed.

Referring to the keys' scissor-linkage 10: this multiple-X matrix is constructed primarily of a number of essentially horizontal and parallel microbusbars 12 (whose back ends in FIG. 1 are oriented slightly to the left of their front ends: i.e. \\\\\\\\), a similar but not necessarily exact number of essentially horizontal and parallel braces 14 (whose back ends in FIG. 1 are oriented slightly to the right of their front ends: i.e. //////), and three rows of connectors 16 located where the back ends of microbusbars 12 and braces 14 intersect (connectors 16B), where their centers intersect (connectors 16C) and where their front ends intersect (connectors 16F). Microbusbars 12 support the individual keys 2 mounted on their tops and include the microcircuitry that conducts the electrical code from any depressed key 2 to the computers circuitry 39. Braces 14 are made of a material that is structurally strong enough to stabilize the microbusbars 12 and support the keys 2 above when said keys are operated. Connectors 16 transfer the required stability imparted from braces 14 to microbusbars 12 and vice versa, allow the rotation of microbusbars 12 against braces 14 through connectors 16 when keyboard 1 is opened or closed, and in this embodiment of the Disclosed Invention carry the microcircuitry that conducts the electrical code from any depressed key 2 to the computer's operational circuitry 39 outside the invention.

In this embodiment of the Disclosed Invention, the back connector 16B under approximately key F7 (the centermost key in the top row of keys) extends downward to form an essentially vertical pivot anchor PA that keeps the keyboard connected to the computer and holds the area of keyboard 1 at connector 16 stationary while the keys to the right and left of this point are extended or contracted; in which the upper portion of pivot anchor PA allows its proximate microbusbar 12 and brace 14 to rotate slightly about said vertical axis while the lower portion of pivot anchor PA is anchored in the computer body 20 that underlies scissor-linkage 10. In other embodiments of the Disclosed Invention, pivot anchor PA can be located at the bottom of the total keyboard/scissor-linkage assembly instead of the top.

In this embodiment of the Disclosed Invention, keyboard 1 is positioned accurately and prevented from moving laterally while its keys 2 are being operated in either open or closed position by providing each front connector 16F with a projecting positional guide 33 on its underside so that said guide 33 will mate with a similarly sized indented positional guide 34 located on the computer body 20 on which the scissor-linkage 10 rests; in which all the projecting guides 33 mate with one row of indented guides 34-C when scissor-linkage 10 is in closed position, then the same projecting guides 33 mate with another row of indented guides 34-O when scissor-linkage 10 is in open position. In other embodiments of the Disclosed Invention, similar positional guides 33 and 34 can be located at the top of the total keyboard/scissor-linkage assembly instead of at the bottom.

In this embodiment of the Disclosed Invention, positional guides 33 and 34 also conduct the electronic code from any depressed key 2 to the parent computer's motherboard circuitry 39 through electrical contacts located on the mating surfaces of guides 33 and 34. This is shown in FIG. 3A, an enlarged section through a front connector 16F which includes a schematic of the microcircuitry between key 2 and the computer's microcircuitry 17L. Although there are numerous ways in which such microcircuitry is present in today's computers, this particular schematic shows microconductors 17U carrying the electrical code from any depressed key 2 through microbusbar 12, brace 14, connector 16F, and projecting positional guide 33 to indented positional guide 34, where keyboard microcircuitry 17U mates with computer microcircuitry 17L to conduct the electrical code on to the computer's circuitry 39. In other embodiments of the Disclosed Invention, the electrical code from keys 2 could be conducted through the back connectors 16B instead of the front connectors 16F, or said conductance could occur via wireless means (i.e. infrared or remote control) directly from keys 2 or microbusbars 12 to the computer's operational circuitry 39.

In this embodiment of the Disclosed Invention, the rightmost microbusbar 12 and leftmost brace 14 of scissor-linkage 10 project outward toward the keyboard's front to form two handles 18R and 18L to facilitate the opening and closing of keyboard 1, in which each handle 18 has indents 19 that allow the tips of one's thumb and forefinger to more easily grasp the ends of handles 18. In other embodiments of the Disclosed Invention, handles 18 could have indents, pads, projections, or any combination thereof that would optimize the opening and closing of keyboard 1.

Referring to computer body 20 around and under keyboard 1: although computer body 20 can have many sizes and configurations (or even lack thereof), in this embodiment of the Disclosed Invention computer body 20 has two back keyboard supports 27L and 27R and two front keyboard supports 28L and 28R. Back supports 27L and 27R extend from the vicinity of computer body 20's back left and right corners to provide support for the rearmost and outermost keys 2 when keyboard 1 is in open position, while front supports 28L and 28R extend from the vicinity of computer body 20's front left and right corners to provide support for the frontmost and outermost keys 2 when keyboard 1 is in open position. In this particular embodiment, front keyboard supports 28L and 28R also have on their tops the outermost indented positional guides 34 that receive the corresponding projecting positional guides 33 on the underside of scissor-linkage 10 when keyboard 1 is in open position.

Referring to FIG. 2 of the Drawings: This frontal section shows the left half of keyboard 1 and scissor-linkage 10 in open position and the right half in closed position. In particular this view shows keys 2 mounted on the plurality of microbusbars 12, the plurality of braces 14 just below, the projecting positional guides 33 that mate with indented positional guides 34 (outlined in dotted lines) located in computer body 20, and the left keyboard supports 27L-O and 28L-O in open position. The right half of this view shows in dotted lines the open position of keyboard 1R-O, scissor-linkage 10R-O, and right keyboard braces 27R-O and 28R-O.

Referring to FIG. 3 of the Drawings: This left side view of the keyboard 1 and scissor-linkage 10 in open position shows the leftmost keyboard keys 2 mounted on the leftmost microbusbar 12, leftmost brace 14 just below which includes projecting handle 18L-O, left keyboard supports 27L-O and 28L-O in open position, and the leftmost projecting positional guide 33 which mates with the leftmost indented positional guide 34-O (shown in dotted lines) in computer body 29. Also shown in dotted lines is the leftmost indented positional guide 34-C in computer body 20 which receives said projecting positional guide 33 when the keyboard/scissor linkage assembly is in closed position. This view also shows in dotted lines the position of keyboard 1-C and scissor-linkage 10-C in closed position. A right side view of this assembly is essentially a mirror image of the left side view.

Referring to FIG. 3A of the Drawings: As explained above, this is an enlarged section through a front connector of the keyboard's scissor-linkage.

Figure 4:
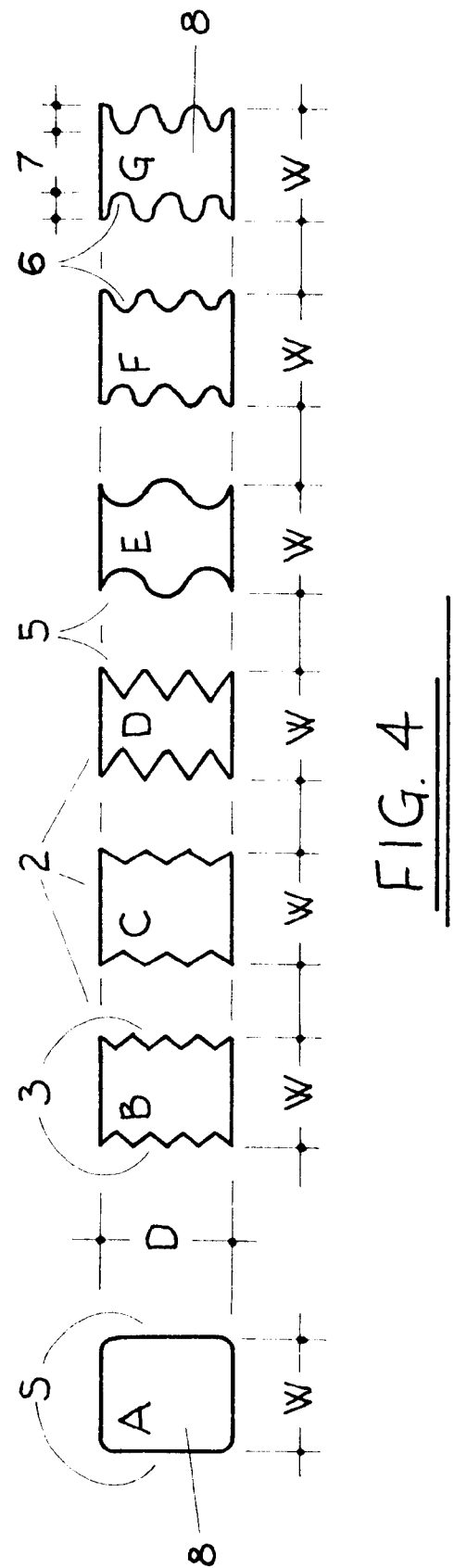
FIG. 4 shows top views of several individual keys, in which key A is of standard shape while the other keys to the right have side edges with various interlocking profiles as typified in the Disclosed Invention.

Referring to FIG. 4 of the Drawings: In this top view of several keyboard keys, key A is an outline of a typical 'Chiclet' style key from a standard computer keyboard. Note the rectangular aspect of key A's top surface, its standard depth or front-to-back dimension D, its standard width or side-to-side dimension W, and its straight side edges. Then note that the other keys to the right have the same depth and width as key A but their side edges have various indented profiles 6 which allow any two of said other keys having matching profiles to interlock so their centers will be closer together when in the same plane than could occur with two side-to-side keys A. These keys can have a variety of other configurations without any of them diverging from the essential nature of what has been described herein.

Figure 5:
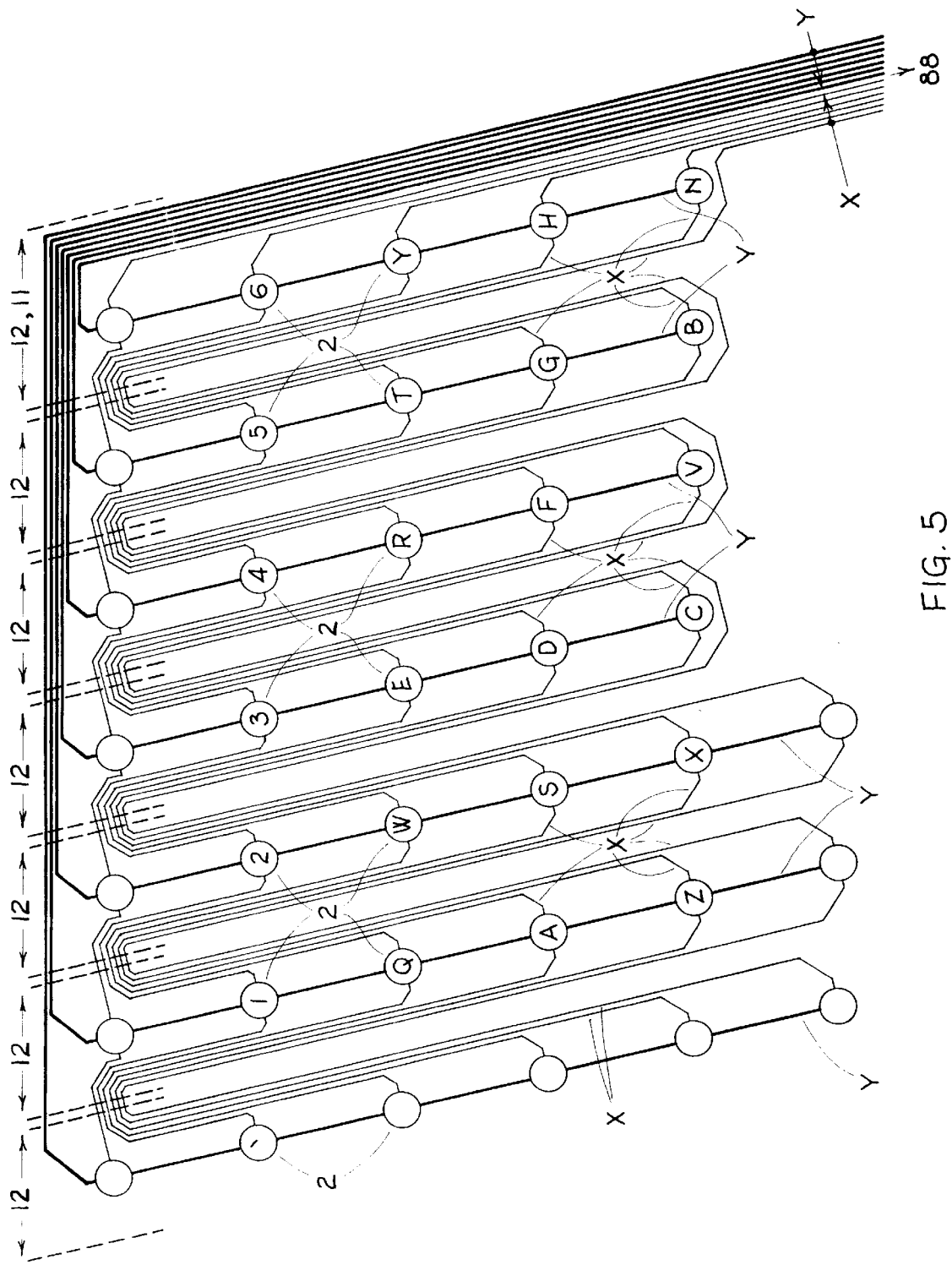
FIG. 5 is a microcircuitry diagram of essentially the left half of the keyboard: i.e. the spine bar (the bar that supports keys F6 6 Y H N) and the keys to its left. The microcircuitry map of the keys to the right of the spine bar is for the most part a mirror image of the keys to the left.

Referring to FIG. 5 of the Drawings: This is a microcircuitry diagram of the left side of keyboard 1 including spinebar 11 (the microcircuitry on the right side of keyboard 1 is essentially a mirror image of that on the left side). In this top view keyboard keys 2 and microbusbars 12 are located somewhat as they would be on an actual keyboard 1; however, keys 2 are shown not as they actually look but as circles containing the character each key types (but all the nonalphanumeric keys are blanks as their multi-letter characters are not adaptable to this format), busbars 12 are shown not in solid but partial dotted lines, and spine bar 11 is shown as wider than the other busbars 12 (in order that the larger number of conductors in this busbar may be clearly portrayed) even though in most embodiments this bar has the same width as the other busbars 12.

In this microcircuitry diagram, each microconductor or wire X carries the electrical code from a horizontal row of keys 2 to each busbar 12 to each adjacent busbar 12 to the spine bar 11 to XY decoder 88 inside computer body 20; and each microconductor or wire Y carries the electrical code from a near-vertical (i.e. \\\\\\\) row of keys 2 to each busbar 12 to each adjacent busbar 12 to spine bar 11 to XY decoder 88. This microcircuitry in whole or in part can have a variety of other configurations without any of them diverging from the essential nature of what has been described herein.

Referring to FIG. 6 of the Drawings: This includes two perspective views of a straight flexible flat cable conductor 40, which in this embodiment of the Disclosed Invention conducts the electric code between two adjacent microbusbars 12 whether they are open or closed, in which the ends of straight flexible flat cable conductor 40 are attached to plugs 42 located beneath the top ends of adjacent busbars 12. FIG. 6-OPEN shows flexible flat conductor 40 in a somewhat flat configuration when adjacent busbars 12 are in open position, and FIG. 6-CLOSED shows flexible flat conductor 40 in a looped configuration when adjacent busbars 12 are in closed position. In this manner the electrical code from the several keys 2 mounted on any busbar 12 is conducted through a series of straight flexible flat cable conductors 40 along successive busbars toward spinebar 11 whether keyboard 1 is open or closed. Also shown in these views are braces 14 below busbars 12. This conductor's related assembly in whole or in part can have a variety of other configurations without any of them diverging from the essential nature of what has been described herein.

Referring to FIG. 7 of the Drawings: This includes two perspective views of a W-shaped flexible flat cable conductor 44, which in this embodiment of the Disclosed Invention conducts the electrical code between any two adjacent microbusbars 12 whether busbars 12 are open or closed (this conductor can also be located between any two adjacent braces), in which the ends of W-shaped flexible flat cable conductor 44 are attached to plugs 42 located between adjacent side indents 12-IS in adjacent busbars 12. FIGS. 7-OPEN shows flexible flat conductor 40 in an extended configuration between adjacent side indents 12-IS when adjacent busbars 12 are in open position, and FIG. 7-CLOSED shows flexible flat conductor 40 in a compact configuration between adjacent side indents 12-IS when adjacent busbars 12 are in closed position. These two view also show how the various folds in flat cable 44 enable it to open and close flexibly while remaining in nearly the same plane that it expands and contracts. Such multi-folded flat conductors can have numerous kinds of folds or pleats to achieve the same flexible conductance of which the one shown is only an example, and this conductor in whole or in part can have a variety of other configurations without any of them diverging from the essential nature of what has been described herein.

Figure 8:
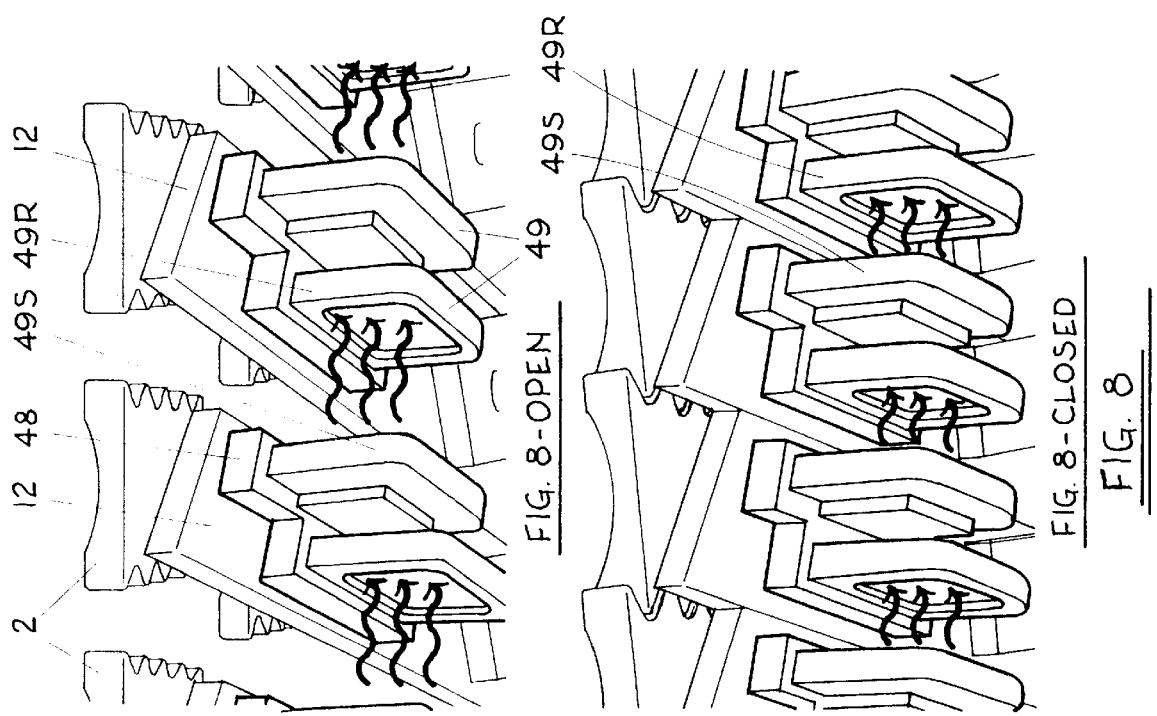
FIGS. 8-OPEN and 8-CLOSED show open and closed views of a wireless or infrared (IR) means of conducting electricity which in this particular embodiment is situated between two adjacent microbusbars in open and closed position.

Referring to FIG. 8 of the Drawings: This includes two perspective views 8-OPEN and 8-CLOSED of a wireless or infrared (IR) means of conducting electricity, which in this embodiment of the Disclosed Invention conducts the electrical code between any two adjacent microbusbars 12 whether busbars 12 are open or closed, in which said conductance proceeds from any one busbar 12 to a driver microchip 48 located beneath the end of busbar 12, from where chip 48 activates a contiguous infrared sender diode 49S that transmits the electric code through the air—i.e. wirelessly—to an infrared receiver diode 49R similarly mounted on adjacent busbar 12, from where the electric code is conducted similarly along successive busbars to spine bar 11. This infrared assembly can be located almost anywhere along busbars 12 or even braces 14, as long as the conducting surfaces of sender photodiode 49S and receiver photodiode 49R face somewhat toward each other when each pair of diodes 49 are in open or closed position. This infrared assembly can have a variety of other configurations without any of them diverging from the essential nature of what has been described herein.

Figure 9:
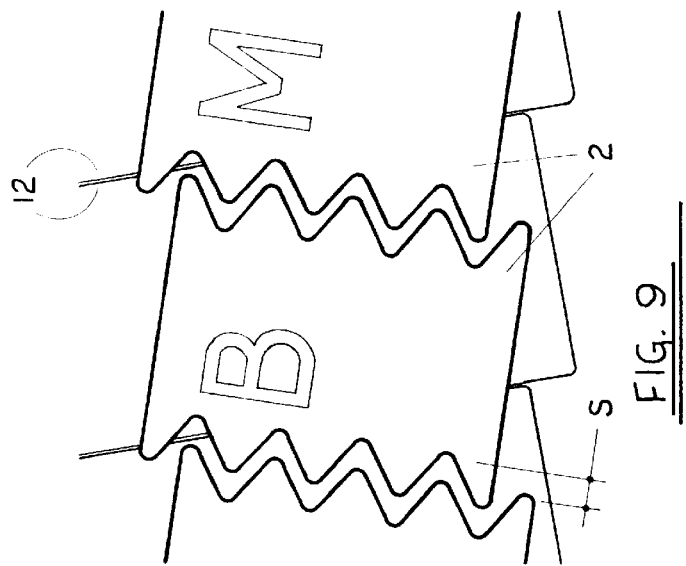
FIG. 9 is an enlarged top view of two adjacent microbusbars and the keys above that shows how the busbars' sides abut each other when the keyboard is closed in a manner that limits its minimum width and also maintains a slight space between the sides of any two adjacent keys.

Referring to FIG. 9 of the Drawings: This is a top view of a small part of keyboard 1 in closed position, in which the adjacent sides of any two microbusbars 12 abut each other and maintain a small space S between the slightly narrower keys 2 above. Thus the widths of microbusbars 12 determine the minimum width of keyboard 1 when it is closed, and they keep the sides of any two adjacent keys 2 from touching each other which prevents a depressed key from activating another. These assemblies can have a variety of other configurations without any of them diverging from the essential nature of what has been described herein.

Referring to FIG. 10 of the Drawings: This includes two views of two adjacent braces 14 with integral hooks or latches 50 on their sides, which in this particular embodiment of the Invention limit keyboard 1's maximum width when it is open. In FIG. 10-CLOSED the ends of hooks 50 are nested in indents 51 in the sides of adjacent braces 14 as keyboard 1 is closed; then as keyboard 1 opens, the ends of each pair of hooks 50 move outward toward each other, until in FIG. 10-OPEN their ends catch on each other to prevent the keyboard from opening any wider, and this establishes the 19 mm pitch of keys 2 when they are open. Such catching of said hooks 50 also eliminates a phenomenon described earlier in this Specification as "linkage-lag", in which if hooks 50 or similar limiting device are not present, as keyboard 1 is opened its outermost keys 2 tend to open too wide before the innermost keys start to spread apart. FIG. 10-SEC is a section thro' hooks 50 in closed position in which each adjacent hook 50 has a projecting face 52 that mates with an indented surface 53 in opposing hook 50 to ensure the hooks' planar alignment as they come together. This hooking mechanism can be located on almost any part of braces 14, and it can have a variety of other configurations without any of them diverging from the essential nature of what has been described herein.

Referring to FIG. 11 of the Drawings: This includes four views of a series of sliding slotted stops 54 located on the underside of braces 14, which in this particular embodiment of the Disclosed Invention limit the maximum width of keyboard 1 when it is open. FIG. 11-54 is a perspective view of sliding slotted stop 54 which is made of a thin strong rustproof metal or equal material, whose channel-like shape has an inner web 54W between two side flanges 54F, in which web 54W contains near one end an elongate hole 56 and near the other end a small round hole 57 whose diameter is the same as the width of elongate hole 56. In FIG. 11-OPEN and 11-CLOSED, each hole 56 and 57 receives a panhead screw or similar connector 55 in a way that loosely fastens the ends of stop 54 to the undersides of two braces 14 and also enables the screw in elongate hole 56 to slide freely back and forth as keyboard 1 opens and closes. Thus, when each pair of connectors 55 in each sliding stop 54 are their maximum distance apart as in FIG. 11-OPEN, keyboard 1 can open no wider, and this establishes the 19 mm pitch of keys 2 when they are open. Sliding stops 54 also eliminate the above-described linkage-lag which tends to occur as keyboard 1 is opened if stops 54 or similar limiting device are not present. Operation of the Disclosed Invention's working prototypes revealed that stops 54 did not need to be connected to every pair of adjacent braces, that connection to every other brace was adequate, to eliminate linkage-lag in keyboard 1 as it opens and closes. FIG. 11-SEC. is a section thro' keyboard 1, scissor-linkage 10, and sliding stops 54 that shows a shallow trench 58 in computer top 20T that provides riding room for sliding stops 54 as keyboard 1 opens and closes. The plurality of sliding slotted stops 54 can connect to braces 14 anywhere along their undersides, they can be connected in more than two rows, and they can have a variety of other configurations without any of them diverging from the essential nature of what has been described herein.

Referring to FIG. 12 of the Drawings: This includes four views of a spacebar handle mechanism 60, which in this particular embodiment of the Disclosed Invention either raises spacebar 62 to facilitate opening and closing of keyboard 1 or lowers spacebar 62 to clamp keyboard 1 securely in place while it is being used when open or closed. Spacebar handle mechanism 60 includes a somewhat angle-shaped spacebar base 64 which is below spacebar 62 and contains an upper flange 64UF and lower flange 64LF, a double torsion spring 66 which has a looped stop in its center and fits into lower flange 64LF, a shaft 68 which fits into lower flange 64LF and holds spring 66 in place, a handle 70 whose back edge is located adjacent to spacebar 62 and whose front edge has a slightly projecting lever 70F, a handle base 74 which is located below handle 70 and which has a deep notch 74N and downward-projecting catch 74C, two spacers 72 which fit between handle 70 and handle base 74 to form grooves between the sides of parts 70 and 74, a wirelike connector 69 with hooks on each end that joins handle base 74 to spacebar base 64, a somewhat box-like handle case 76 which contains a catch spring 78 and has two side flanges 76F that fit into two grooves between the sides of handle base 74 and handle base 76, and computer indent 20-I which receives handle case 76 and other portions of spacebar handle mechanism 60.

FIG. 12-EXP is an exploded view of spacebar handle mechanism 60 which shows how it lifts or lowers adjacent spacebar 62 as follows: when one pulls lever 70F of handle 70 frontward (away from keyboard 1), this action pulls handle base 74 and connector 69 frontward in a way that enables connector 69 to pull frontward the edged portion of spacebar base 64 that lies between its upper and lower flanges 64UF and LF, which, because the base of lower flange 64LF is held in place by shaft 68, leverages the far end of upper flange 64UF and spacebar 62 upward. At the same time as handle base 74 is moving frontward, its downward-projecting catch 74C rides over a hump in catch spring 78 below, depressing this spring slightly, then after catch 74C has passed over this hump, spring 78 rises to prevent catch 74C from returning to its original position; and this stoppage keeps spacebar 62 in "up" or "lift" position. Next, by pulling lever 70F of handle 70 backward (toward keyboard 1) slightly more forcibly than was exerted during the frontward action described above, downward-projecting catch 74C rides again over the hump in catch spring 78, whereupon double torsion spring 66 in lower flange 62LF forces spacebar 62 down with enough pressure to make spacebar 62 hold keyboard 1 securely in place. All these movements are further clarified by FIG. 12-UP, a section thro' the spacebar handle assembly when the spacebar is lifted up, FIG. 12-DOWN, a section thro' the spacebar handle assembly when the spacebar presses downward as a clamp, and FIG. 12-SEC, a lateral section thro' the handle assembly when spacebar 62 is down. Although the operation of spacebar handle mechanism 60 has been described in considerable detail above, each portion of this assembly and the assembly as a whole can have a variety of configurations, each of which is capable of being equally efficacious as the one described herein.

Referring to FIG. 13 of the Drawings: This includes two sectional views of a spring/catch mechanism 82 beneath spacebar 62, FIG. 13-DOWN thro' their left halves when in down position, and FIG. 13-UP thro' their right halves when in up position. In this particular embodiment of the Disclosed Invention, spring/catch mechanism 82 beneath spacebar 62 moves this key slightly upward to facilitate the opening and closing of keyboard 1. Spring/catch mechanism 82 includes two upper catches 83 which protrude downward from the underside of spacebar 62 on each side of XY decoder 88 (or other interior portion of computer 20) and which have faces 83U and 83L, two lower catches 84 which project upward from computer body top 20T on each side of XY decoder 88 and which have faces 84U and 84L, and two springs 86 on each side of XY decoder 88 which apply a slight extensive force between the underside of spacebar 62 and computer top 20T.

Sectional view 13-DOWN shows spring/catch mechanism 82 and spacebar 62 above in "down" or normally operable position, in which upper face 83U of upper catches 83 mates with lower face 84L of lower catch 84; and sectional view 14-UP shows spring/catch mechanism 82 and spacebar 62 in "up" position, in which lower face 83L of upper catch 83 mates with upper face 84U of lower catch 84. Faces 83U, 83L, 84U, and 84L are angled so that only a slight pressure against the underside of spacebar 62 (i.e. the top ends of microbusbars 12 pressing the overlapping edges of spacebar 62 upward as keyboard 1 is lifted slightly when it is opened or closed) makes the outer edges of catches 83 and 84 (which have slightly flexible bases) slip past each other in a way that makes spacebar 62 move upward, but a similar pressure on top of spacebar 62 forces spacebar 62 back down to its operating position. The strength of springs 86 also urges this up-down action as desired. When spacebar 62 is in operating position, springs 86 also maintain a slight gap G between spacebar 62 and its lowermost position when it closes an electric circuit (not shown) during normal typing activity. Spring/catch mechanism 82 can have a variety of other configurations without any of them diverging from the essential nature of what has been described herein.

Referring to FIG. 14 of the Drawings: This includes four views of an outrigger 90 located under each of the four corners of keyboard 1, which in this particular embodiment of the Disclosed Invention supports the outermost portions of keyboard 1 when it is open. There are four outriggers 90, each of which has a predominantly horizontal inner end 90-I that slides into an encasement 25 near one of the four bottom corners of computer body 20, a predominantly vertical outer end 90-O that rises under a corner of keyboard 1 and connects to it and supports it when keyboard 1 is open, and a structurally appropriate cross-section (shown here as an inverted T). Encasement 25 has a void 25V that envelops outrigger 25's cross-section in a manner that supports inner end 90-I when only part of end 90-I remains in void 25V when keyboard 1 is open (in which the innermost part of end 90-I is located at OP) and also allows inner end 90-I to slide within the length of void 25V until virtually all of inner end 90-I is within void 25V when keyboard 1 is closed (in which the innermost part of end 90-I is located at CL). A connector 92 at the top of each outrigger's outer end 90-O fastens outer end 90-I to the underside of a microbusbar 12 or brace 14 in scissor-linkage 10 in a way that is strong enough vertically to support a corner of keyboard 1 when it is open, yet connector 92 allows outer end 90-O to rotate slightly in a horizontal plane as keyboard 1 opens and closes. Also, the side of computer 20 contains an inset 126 that snugly receives and largely conceals outer end 90-O when keyboard 1 is closed. Sectional view 14-CLOSED shows outrigger 90 and its related parts when keyboard 1 is closed, sectional view 14-OPEN shows the same parts when keyboard is open, end view 14-END shows how outrigger 90 fits into inset 126 when keyboard 1 is closed, and section 14-SEC shows how inner end 90-I fits snugly but slidably inside void 25V of encasement 25. In these views the means by which electricity is conducted from one microbusbar 12 to the next are omitted for clarity. Outrigger 90's shape and related assembly can have a variety of other configurations without their diverging from the essential nature of what has been described herein.

Referring to FIG. 15 of the Drawings: This includes three views of a leg 96 located under each of the four corners of keyboard 1, which in this particular embodiment of the Disclosed Invention supports the outermost portions of keyboard 1 when it is open. Each of four legs 96 has a top 96T which supports keyboard 1 when it is open, a predominantly vertical shaft 96S which is strong enough to support keyboard 1 when it is open and withstand the rigors of sliding beneath keyboard 1 as it is opened or closed, and a foot 96F that lies on the computer's resting surface 21 and whose underside is round enough to slide without catching on any roughage in the computer's resting surface 21 as keyboard 1 opens or closes. Also, a connector 98 at the top of each leg 96 fastens top 96T to the underside of a microbusbar 12 or brace 14 in scissor-linkage 10 in a way that supports a corner of keyboard 1 when it is open. Sectional view 15-OPEN shows leg 96 and its related parts when keyboard 1 is open, sectional view 15-CLOSED shows the same parts when keyboard is closed, and end view 15-END shows how leg 96 fits snugly and slidably into inset 26L near a corner of computer body 20 when keyboard 1 is closed. In these views the means by which electricity is conducted from one microbusbar 12 to the next are omitted for clarity. Leg 96's shape and related assembly can have a variety of other configurations without any of them diverging from the essential nature of what has been described herein.

Although the disclosed invention has now been described in a few particular embodiments with a certain degree of particularity, each portion of its assembly and operation in whole or in part can be said to have numerous embodiments or configurations, each of which in and of itself and in any combination thereof are capable of being equally efficacious as the particular embodiments described herein, and further that the primary spirit of this specification does not lie in any description of any specific embodiments or configurations thereof as much as in what they impart to the disclosed invention due to their innate merits—that what an embodiment is is not necessarily what it does; thus it should be understood that this description of any particular embodiments of the disclosed invention has been made only by way of example, and that numerous combinations and arrangements of said embodiments' various elements, as well as any number of changes in construction and aesthetic details, may be resorted to without departing from the essential scope and spirit of the invention as hereinafter claimed; and that this invention's patent if granted shall cover, by suitable interpretation of the appended claims, whatever features of variety that would be compatible with the essence of what is claimed:

What is claimed is:

1. An apparatus for inputting data into a computer or other electronic device which includes a keyboard with several rows of electrically activated alphanumeric and operational keys in which each key in said rows has a somewhat rectangular shape except an elongate spacebar, in which
   (a) said somewhat rectangular keys are arranged on a laterally flexible assembly that enables said keys to expand or contract in a direction toward their sides, in which the maximum expansion or open position of said keys has the same spacing as the keys on a standard-sized computer keyboard and the minimum contraction or closed position of said keys is substantially less, in which said laterally flexible assembly includes
      (1) a plurality of essentially planar and parallel upper bars, each of which supports a plurality of keys on its top and contains electrical conductors that extend from said keys to each adjacent upper bar in said laterally flexible assembly toward one upper bar from where said conductors enter said computer or other electronic device; as well as
      (2) a plurality of essentially planar and parallel lower bars located in a plane below said upper bars; as well as
      (3) a plurality of connectors that hold together said upper and lower bars along their backs, centers, and fronts so that said upper bars can move laterally against said lower bars and vice versa in a way that enables said keys on said upper bars to open and close; and
   (b) said keys have interlocking sides which enable the centers of two adjacent keys to be nearer together when they are closed than if said keys had straight sides; and
   (c) the elongate spacebar is located separately from said laterally flexible assembly so that when the other keys open and close said spacebar remains laterally stationary;
   whereby when said keyboard is open said keys have the same spacing as the keys on a standard keyboard and are electrically operable, and when said keyboard is closed said keys interlock and are also electrically operable, and
   whereby when said keyboard is open one can type at full speed on a full-size keyboard mounted on a very small computer, and when said keyboard is closed one can type on the same computer while standing, walking, or otherwise engaging in numerous mobile activities.

2. The apparatus for inputting data according to claim 1 in which said keys rotate when said keyboard opens and closes so that two interlocking keys can have symmetrical sides.

3. The apparatus for inputting data according to claim 1 which includes a connector that holds a small area of said keyboard to an underlying surface while allowing all other areas of said keyboard to move laterally above said underlying surface.

4. The apparatus for inputting data according to claim 1 which has guides on its underside that articulate said keyboard's open and closed positions on said underlying surface.

5. The apparatus for inputting data according to claim 4 in which said guides on the underside of said keyboard articulate an intermediate position of said keyboard between said open and closed positions.

6. The apparatus for inputting data according to claim 1 which includes supports that hold up said keyboard's outermost keys that project beyond the sides of said underlying surface when said keyboard is in open position.

7. The apparatus for inputting data according to claim 6 in which each of said supports has a slidable shaft and a contiguous post, in which part of said shaft remains in the computer and part of said post connects to said keyboard's underside and holds up a portion of said keyboard's outermost keys.

8. The apparatus for inputting data according to claim 6 in which each of said supports has a leg whose bottom rests on the plane on which said computer rests and whose top connects to said keyboard's underside and holds up a portion of said keyboard's outermost keys.

9. The apparatus for inputting data according to claim 1 that includes a handle projecting from each side of said keyboard which facilitates the opening or closing of said keyboard.

10. The apparatus for inputting data according to claim 1 that includes a plurality of flexible flat cables, each of which conducts electricity from an upper bar to an adjacent upper bar and/or from one upper bar to said computer or other electronic device whether said keyboard is open or closed.

11. The apparatus for inputting data according to claim 10 wherein said flexible flat cables of said apparatus include folds that enable said cable to lengthen or shorten so that said cable conducts electricity whether it is lengthened or shortened.

12. The apparatus for inputting data according to claim 1 that includes a plurality of conductors that conduct electricity via wireless or infrared means from an upper bar to an adjacent upper bar and/or from one upper bar to said computer or other electronic device whether said keyboard is open or closed.

13. The apparatus for inputting data according to claim 1 in which said upper bars have a width that is greater than the minimum width of said indented keys and sides which abut the sides of adjacent upper bars when said keyboard is closed, so that said widths combined with said abutting sides keep said indented sides of any adjacent keys from touching each other when said keyboard is closed.

14. The apparatus for inputting data according to claim 1 in which said lower bars have hooks on both sides that enable said hooks on the nearest sides of adjacent bars to interlock in a manner that determines the proper spacing between said keys when said keyboard is open.

15. The apparatus for inputting data according to claim 1 in which a plurality of slotted mechanisms are slidably connected to the undersides of said lower bars, so that when said keyboard is opened a series of connectors in said slotted mechanisms slide until they stop in a manner that determines the proper spacing between said keys when said keyboard is open.

16. The apparatus for inputting data according to claim 1 which includes a handle mechanism contiguous to the spacebar that urges said spacebar upward to facilitate the opening and closing of said keyboard and/or urges said spacebar downward to hold said keyboard secure when it is open or closed.

17. The apparatus for inputting data according to claim 1 which includes a mechanism under the spacebar that urges said spacebar upward to facilitate the opening and closing of said keyboard and/or urges said spacebar downward to its normal position before it is used.

18. A method further including the steps of inputting data into a computer or other electronic device which includes a keyboard with several rows of electrically activated alphanumeric and operational keys in which each key in said rows has a somewhat rectangular shape except an elongate spacebar, comprising
  (a) arranging said somewhat rectangular keys on a laterally flexible assembly that enables said keys to expand or contract toward their sides, in which the maximum expansion or open position of said keys has the same spacing as the keys on a standard-sized computer keyboard and the minimum contraction or closed position of said keys is substantially less, in which said laterally flexible assembly includes
    (1) a plurality of essentially planar and parallel upper bars, each of which supports a plurality of keys on its top and contains electrical conductors that extend from said keys to each adjacent upper bar in said laterally flexible assembly toward one upper bar from where said conductors enter said computer or other electronic device; as well as
    (2) a plurality of essentially planar and parallel lower bars located in a plane below said upper bars; as well as
    (3) a plurality of connectors that hold together said upper and lower bars along their backs, centers, and fronts so said upper bars can move laterally against said lower bars and vice versa in a way that enables said keys on said upper bars to open and close; and
  (b) providing said keys with interlocking sides that enable the centers of two adjacent keys to be nearer together when they are closed than if said keys had straight sides; and
  (c) providing said elongate spacebar with a separate location from said laterally flexible assembly so that when the other keys open and close said spacebar remains laterally stationary;
  whereby when said keyboard is open said keys have the same spacing as the keys on a standard keyboard and are electrically operable, and when said keyboard is closed said keys interlock and are also electrically operable, and
  whereby when said keyboard is open one can type at full speed on a full-size keyboard mounted on a very small computer, and when said keyboard is closed one can type on the same computer while standing, walking, or otherwise engaging in numerous mobile activities.

19. A method according to claim 18 further including the step of providing keys that rotate when said keyboard opens and closes so that two interlocking keys can have symmetrical sides.

20. A method according to claim 18 further including the step of providing a connector that holds a small area of said keyboard to an underlying surface while allowing all other areas of said keyboard to move laterally above said underlying surface.

21. A method according to claim 18 further including the step of providing guides on the underside of said keyboard that articulate said keyboard's open and closed positions on said underlying surface.

22. A method according to claim 21 further including the step of providing guides on the underside of said keyboard that articulate an intermediate position of said keyboard between said open and closed positions.

23. A method according to claim 18 further including the step of providing supports that hold up said keyboard's outermost keys that project beyond the sides of said underlying surface when said keyboard is in open position.

24. A method according to claim 23 further including the step of providing each of said supports with a slidable shaft and a contiguous post, in which part of said shaft remains in the computer and part of said post connects to said keyboard's underside and holds up a portion of said keyboard's outermost keys.

25. A method according to claim 23 further including the step of providing each of said supports with a leg whose bottom rests on the plane on which said computer rests and whose top connects to said keyboard's underside and holds up a portion of said keyboard's outermost keys.

26. A method according to claim 18 further including the step of providing a handle that projects from each side of said keyboard which facilitates the opening or closing of said keyboard.

27. A method according to claim 18 further including the step of providing a plurality of flexible flat cables, each of which conducts electricity from an upper bar to an adjacent upper bar and/or from one upper bar to said computer or other electronic device whether said keyboard is open or closed.

28. A method according to claim 27 further including the step of providing each flexible flat cable with folds that enable said cable to lengthen or shorten so that it conducts electricity whether it is lengthened or shortened.

29. A method according to claim 18 further including the step of conducting electricity via wireless or infrared means from an upper bar to an adjacent upper bar and/or from one upper bar to said computer or other electronic device whether said keyboard is open or closed.

30. A method according to claim 18 further including the step of providing said upper bars with a width that is greater than the minimum width of said indented keys and sides which abut the sides of adjacent upper bars when said keyboard is closed, so that said widths combined with said abutting sides keep said indented sides of any adjacent keys from touching each other when said keyboard is closed.

31. A method according to claim 18 further including the step of providing said lower bars with hooks on both sides that enable said hooks on the nearest sides of adjacent bars to interlock in a manner that determines the proper spacing between said keys when said keyboard is open.

32. A method according to claim 18 further including the step of providing a series of slotted mechanisms which are slidably connected to the undersides of said lower bars, so that when said keyboard is opened a series of connectors in said slotted mechanisms slide until they stop in a manner that determines the proper spacing between said keys when said keyboard is open.

33. A method according to claim 18 further including the step of providing a handle mechanism contiguous to the spacebar that urges said spacebar upward to facilitate the opening and closing of said keyboard and/or urges said spacebar downward to hold said keyboard secure when it is open or closed.

34. A method according to claim 18 further including the step of providing a mechanism under the spacebar that urges said spacebar upward to facilitate the opening and closing of said keyboard and/or urges said spacebar downward to its normal position before it is used.

* * * * *